(12) United States Patent
Wright

(10) Patent No.: US 10,821,839 B1
(45) Date of Patent: Nov. 3, 2020

(54) POWER MANAGEMENT OF ELECTRICAL VEHICLES USING RANGE EXTENDING TURBINES

(71) Applicant: Wrightspeed, Inc., Alameda, CA (US)

(72) Inventor: Ian Wright, Alameda, CA (US)

(73) Assignee: Wrightspeed, Inc., Alameda, CA (US)

( * ) Notice: Subject to any disclaimer, the term of this patent is extended or adjusted under 35 U.S.C. 154(b) by 339 days.

(21) Appl. No.: 15/887,826

(22) Filed: Feb. 2, 2018

Related U.S. Application Data

(60) Provisional application No. 62/454,084, filed on Feb. 3, 2017.

(51) Int. Cl.
*B60L 3/06* (2006.01)
*B60L 15/20* (2006.01)
*B60L 3/12* (2006.01)
*B60L 58/10* (2019.01)

(52) U.S. Cl.
CPC ............ *B60L 15/2045* (2013.01); *B60L 3/06* (2013.01); *B60L 3/12* (2013.01); *B60L 58/10* (2019.02)

(58) Field of Classification Search
CPC ........ B60L 15/2045; B60L 58/10; B60L 3/06; B60L 3/12
USPC .......................................................... 701/22
See application file for complete search history.

(56) References Cited

U.S. PATENT DOCUMENTS

| | | | | |
|---|---|---|---|---|
| 8,718,897 B2 * | 5/2014 | Wright | ............ | B60W 30/18172 701/89 |
| 8,933,594 B2 * | 1/2015 | Kurs | ...................... | B60L 53/39 307/326 |
| 8,946,938 B2 * | 2/2015 | Kesler | ..................... | H02J 50/90 307/104 |
| 10,274,532 B1 * | 4/2019 | Smith | ..................... | G01R 31/68 |
| RE47,647 E * | 10/2019 | Domes | ...................... | F03D 9/11 |
| 10,457,159 B1 * | 10/2019 | Castelaz | .................. | H02J 7/34 |
| 2015/0367831 A1 * | 12/2015 | West | ...................... | B60W 20/11 701/22 |
| 2016/0052410 A1 * | 2/2016 | Zhou | ................... | B60L 11/1811 320/109 |
| 2016/0243958 A1 * | 8/2016 | Miller | ....................... | B60L 3/12 |
| 2016/0244044 A1 * | 8/2016 | Miller | .............. | B60W 50/0098 |
| 2018/0154779 A1 * | 6/2018 | Chol | ...................... | B60L 58/22 |
| 2018/0201145 A1 * | 7/2018 | Yellambalase | ...... | B60L 11/1818 |

(Continued)

*Primary Examiner* — Peter D Nolan
*Assistant Examiner* — Wae L Louie
(74) *Attorney, Agent, or Firm* — Kwan & Olynick LLP

(57) ABSTRACT

Provided are drivetrain systems of electrical vehicles comprising range extending turbines operable to dissipate some or all power generated by electrical drive motor-generators coupled to vehicle wheels. Also provided are methods of operating such systems. Power dissipation using turbines may be used, for example, when batteries cannot be further charged because of their current state of charge or some other conditions. This turbine power dissipation effectively extends engine braking capabilities of electrical vehicles and reduces operation of friction brakes. The power generated by an electrical drive motor-generator may depend on various limits, such as a vehicle deceleration limit, traction limit, power generation limit, and power receiving limit. Specifically, the electrical power is generated at a level when at least one of these limits is reached but neither is exceeded. Furthermore, the power generation level is continuously and dynamically controlled based on changes in operating conditions.

20 Claims, 5 Drawing Sheets

(56) References Cited

U.S. PATENT DOCUMENTS

| | | | |
|---|---|---|---|
| 2019/0023114 A1* | 1/2019 | Nguyen Huu | H02K 11/046 |
| 2019/0126737 A1* | 5/2019 | Lo | B60L 50/16 |
| 2019/0173298 A1* | 6/2019 | Smith | H02J 7/0072 |
| 2019/0291594 A1* | 9/2019 | Li | B60L 50/90 |
| 2019/0291595 A1* | 9/2019 | Ruan | B60L 50/61 |
| 2019/0305558 A1* | 10/2019 | Abaitancei | F16D 61/00 |

\* cited by examiner

POWER MANAGEMENT OF ELECTRICAL VEHICLES USING RANGE EXTENDING TURBINES

CROSS-REFERENCE TO RELATED APPLICATIONS

This application claims the benefit under 35 U.S.C. § 119(e) of US Provisional Patent Application 62/454,084, entitled: "Power Management of Electrical Vehicles Using Range Extending Turbines" filed on Feb. 3, 2017, which is incorporated herein by reference in its entirety.

BACKGROUND

Electrical vehicles are becoming more popular for personal and commercial uses as a result of various economic, environmental, technological, and other factors. However, electrical vehicles still have some operating limitations in comparison to conventional internal combustion engine (ICE) vehicles. For example, electrical vehicles have some limitations associated with "engine braking" when conventional friction brakes are not used. Specifically, engine braking in electrical vehicles involves their operating drivetrains in a power generation mode. The generated electrical power needs to be consumed, and it is primarily used for charging batteries. Once the battery is fully charged, no other major consumption sources is available for generated electrical power, and the engine braking cannot continue. Furthermore, batteries of electrical vehicles are often kept close to their fully charged state for driving range reasons, which further limits engine braking duration. This engine braking limitation may require greater utilization of friction brakes in comparison to ICE vehicles. At the same time, friction brakes have their own limitations associated with brakes heating. This combination present serious challenges for adding electrical drivetrains in heavy vehicles and/or vehicles operating on long sloped roads, such as hills and mountains. Adding new power management options to utilize generated electrical power in electrical vehicles can help to preserve friction brakes resulting in improved safety, more efficient utilization, and lower maintenance.

SUMMARY

Provided are drivetrain systems of electrical vehicles comprising range extending turbines operable to dissipate some or all power generated by electrical drive motor-generators coupled to vehicle wheels. Also provided are methods of operating such systems. Power dissipation using turbines may be used, for example, when batteries cannot be further charged because of their current state of charge or some other conditions. This turbine power dissipation effectively extends engine braking capabilities of electrical vehicles and reduces operation of friction brakes. The power generated by an electrical drive motor-generator may depend on various limits, such as a vehicle deceleration limit, traction limit, power generation limit, and power receiving limit. Specifically, the electrical power is generated at a level when at least one of these limits is reached but neither is exceeded. Furthermore, the power generation level is continuously and dynamically controlled based on changes in operating conditions.

Provided is a method of operating a drivetrain system of an electrical vehicle. In some embodiments, the method comprises receiving instructions to decelerate the electrical vehicle. The method then proceeds with determining a power generation level based on a deceleration limit, a traction limit, a power generation limit, and a power receiving limit. The power receiving limit may be based on a charging limit of a battery and may be further based on a power dissipating limit of a range extending turbine. The method then proceeds with generating electrical power at the determined power generation level. The electrical power is generated using an electrical drive motor-generator coupled to the wheels of the electrical vehicle. The method also comprises with distributing the electrical power generated by the electrical drive motor-generator to at least one of the battery or the range extending turbine. This power distribution is performed based on the charging limit of the battery and the power dissipating limit of the range extending turbine.

In some embodiments, the power generation level is independently limited by the deceleration limit, the traction limit, the power generation limit, and/or the power receiving limit. In other words, any one or more of these limits may set the power generation level. Usually, only one of these limits actually sets the power generation level while remaining limits are not reaches. Furthermore, a limits that sets the power generation level may change overtime. For example, the vehicle may initially drive on a slippery road, and the traction limit may set the power generation level. In this example, increasing the power generation level may cause the vehicle to slip or otherwise lose traction beyond the traction limit. Later, the road condition may improve and the power generation level may be increased without causing the vehicle to lose traction beyond the traction limit. At the same time, the battery may approach its fully charge state, and the power receiving limit may now set the power generation level. One having ordinary skills in the art would understand that other examples are also within the scope.

In some embodiments, determining the power generation level comprises increasing the power generation level until reaching at least one of the deceleration limit, the traction limit, the power generation limit, or the power receiving limit. For example, no power may be generated initially until the instructions to decelerate the vehicle are received. Upon receiving the instructions, the level of the generated power may be increased until reaching one of the limits. The parameters associated with the limits may be monitored to ensure that neither one of these limits is exceeded.

In some embodiments, determining the power generation level further comprises dynamically controlling the power generation level such that at least one of the deceleration limit, the traction limit, the power generation limit, or the power receiving limit is reached but neither one of these limits is exceeded. In other words, the power generation level is a maximum level at which at least one of the limits is reached but neither one is exceeded.

The power generation level limited by the deceleration limit may depend on road incline. For example, with that limit setting the power generation level, the level will be higher when the vehicle travels downhill than when it travels on a flat road. Furthermore, with the deceleration limit setting the power generation level, the level may also depend on the vehicle weight such that the level is higher for a heavier vehicle than for a lighter vehicle, at least when travelling downhill or on a flat road.

The power generation level limited by the traction limit depends on road surface condition. For example, with that limit setting the power generation level, the level will be lower for a slippery road (e.g., wet road) than for a road with good traction (e.g., dry road). Other factors such as vehicle weight, tire conditions, turning, and the like may affect the power generation level limited by the traction limit.

In some embodiments, the power receiving limit is a sum of the charging limit of the battery and the power dissipating limit of the range extending turbine. Furthermore, the power receiving limit may be equal to the charging limit of the battery if the charging limit is above a certain threshold. In other words, the power dissipating limit of the range extending turbine is not accounted for if the battery has some minimal charging capability.

In some embodiments, the electrical power generated by the electrical drive motor-generator is distributed entirely to the battery if the charging limit of the battery is equal or greater than the power generation level. Specifically, the battery may have the first priority for receiving the generated electrical power since the battery stores the energy for future uses while the range extending turbine irreversibly dissipates the energy into the environment. If the battery is capable of receiving all generated power, then entire generated power may be directed to the battery.

In the same or other embodiments, the electrical power generated by the electrical drive motor-generator is distributed to the range extending turbine. For example, if the charging limit of the battery is less than the power generation level, then at least some of the generated power is directed to the range extending turbine. In some embodiments, the electrical power generated by the electrical drive motor-generator is distributed to both the battery and the range extending turbine. Alternatively, the electrical power generated by the electrical drive motor-generator may be distributed entirely to the range extending turbine.

In some embodiments, distributing the power generated by the electrical drive motor-generator to at least one of the battery or the range extending turbine is further based on the vehicle route and vehicle weight. In these embodiments, the distribution is selected to minimize friction brake usage for the route. The selection process may involve a predictive algorithm, which analyzes expected levels of generated power for each segment of the vehicle route. One consideration of this algorithm may be having the battery at a maximum charge state at a point when power from the battery will be used again. Another consideration may be maximum utilization of the range extending turbine to dissipate generated power, which allows to minimize friction brake usage. A combination of these considerations may lead to a situation when some generated power is distributed to the range extending turbine even though the battery may have its charging limit exceeding the power generation level. In other words, the algorithm may not follow a default rule of charging the battery first at all times. For example, a vehicle route includes a long decline with a mix of steep and shallow segments. The power distribution in each of these segments may be selected based on the overall route information and expected power generation in each segment.

In some embodiments, the instructions to decelerate the electrical vehicles are received from a throttle control of the electrical vehicle. Specifically, the instructions to decelerate the electrical vehicles may be received when a throttle pedal of the throttle control is in a released position.

Provided also is a drivetrain system of an electrical vehicle. In some embodiments, the drivetrain system comprises a battery, a range extending turbine, an electrical turbine motor-generator, an electrical drive motor-generator, and a system controller. The electrical turbine motor-generator is mechanically coupled to the range extending turbine. The electrical drive motor-generator is mechanically coupled to the wheels of the electrical vehicle. The electrical drive motor-generator is electrically coupled to the battery and to the electrical turbine motor-generator. The system controller is configured to determine a power generation level based on a deceleration limit, a traction limit, a power generation limit, a power receiving limit. The power receiving limit is based on a charging limit of the battery and further based on a power dissipating limit of the range extending turbine. In some embodiments, the system controller is coupled to a throttle control of the electrical vehicle. Furthermore, the system controller may be coupled to a global positioning system of the electrical vehicle providing vehicle route information and vehicle position information to the controller for determining the power generation level.

These and other embodiments are described further below with reference to the figures.

DETAILED DESCRIPTION

Figure 1A:
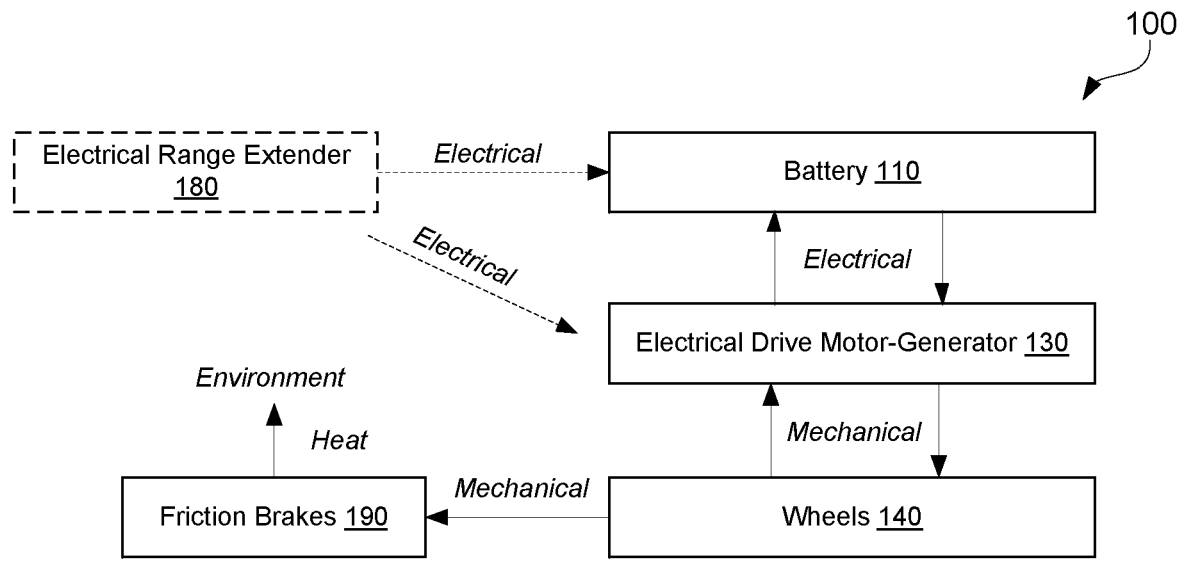
FIGS. 1A and 1B are schematic illustrations of power management options in electrical vehicles, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

For purposes of this disclosure, an electrical vehicle is defined as any vehicle using one or more electrical motors to drive one or more wheels of the vehicle. For example, an electrical vehicle may include one electrical motor for each wheel, one motor for an axle (using a differential), or even one motor for multiple axles (using multiple differentials). An electrical motor uses electrical power to drive the one or more wheels by applying the torque to the wheels and may generate electrical power when the torque is applied by the wheels. As such, the electrical motor may be also referred to as an electrical drive motor-generator.

The electrical vehicle may or may not include electrical range extenders. Electrical range extenders are used to increase vehicle driving ranges and to allow using smaller batteries thereby lowering vehicle cost and, in some instances, lowering vehicle weight. During its use, the electrical range extender generates electrical power which may be directed to a battery (for recharging) and/or to electrical drive motor-generator. The electrical power is generated by rotating an electrical generator using some form drive, such as a turbine, ICE, or the like. Electrical range extenders should not be confused with non-electrical drives supplying mechanical power to the wheels. These non-electrical drives bypass electrical drive motor-generators and do not generate electrical power. For example, an ICE may be connected to a vehicle transmission together with an electrical drive motor-generator. The non-electrical drives are not within the scope of this disclosure.

Drives used in electrical range extenders may be operated in more efficient regimes than, for example, when these drives are used directly to drive the wheels. For example, ICEs used on conventional non-electrical vehicles have low efficiencies during acceleration and other operating conditions. When incorporated into an electrical range extender, efficiency of an ICE may be substantially improved. Furthermore, electrical range extenders are used together with batteries capable to recuperate some energy which results in further fuel economy.

While electrical vehicles tend to be more fuel efficient than their conventional counterparts, they have some operating limitations. One of these limitations associated with "engine braking" when conventional friction brakes are not used. This type of braking is essential for heavy vehicles and/or vehicles operating on long and steep downgrades when capacity of conventional friction brakes is not sufficient. In conventional ICE vehicles may select a lower gear and rely on engine resistance to control vehicle speed indefinitely. In electrical vehicles, a drivetrain may be switched into a power generating mode and generated power may be used to charge the battery. However, the duration of this process is not indefinite and is limited by the current charge of the battery. Once the battery is fully charged, no other major consumption sources is available for generated electrical power, and the engine braking cannot continue. In fact, the engine braking may not be available at all if a vehicle with a fully charged battery starts going downhill.

Power management in electrical vehicles may involve various energy conversion (mechanical-electrical and mechanical-thermal) and power transfers as will now be described with reference to FIGS. 1A and 1B, which illustrate two examples of drivetrain systems 100 of the electrical vehicles. In both examples, drivetrain system 100 includes electrical drive motor-generator 130 coupled wheels 140 and used to provide mechanical power to wheels 140. The same electrical drive motor-generator 130 is also used to convert mechanical power received from wheel 140 into electrical power in a power generation mode. When providing mechanical power to wheels 140, electrical drive motor-generator 130 receives electrical power from battery 110 and, in some instances, from optional electrical range extender 180. As such, electrical drive motor-generator 130 is electrically coupled to battery 110 and to electrical range extender 180. Battery 110 is also coupled to electrical range extender 180. Electrical range extender 180 may be also used to charge battery 110 thereby increasing the range of the vehicle beyond the single battery charge. The electrical power generated by electrical drive motor-generator 130 may be used to charge battery 110.

Wheels 140 are also shown coupled to friction brakes 190. Friction brakes 190 converts mechanical power received from wheels 140 into heat. Friction brakes 190 may have various operating limitations associated with their heating and heat transfer from friction brakes 190 to the environment. For example, friction brakes 190 cannot be used for prolonged periods of times, especially on heavy vehicles and/or vehicles going downhill. Friction brakes 190 also wear and may require frequent replacement. As such, it may be beneficial to reduce mechanical power directed to friction brakes 190 by redirecting this power to electrical drive motor-generator 130.

However, when the power from wheels 140 is applied to electrical drive motor-generator 130 and electrical power is generated, this generated electrical power needs to be used by one or more components. While battery 110 may be a primary choice for receiving this electrical power because of battery's ability to store electrical energy for future use, the capacity of battery 110 is limited and may not be sufficient to accommodate all generated energy. Specifically, battery 110 has a charging power limit that may depend on the charging state of battery 110, temperature, and/or other parameters. In some instances, this charging limit may be less than needed to accommodate all generated power, for example, to avoid use friction brakes 190. If no other power consuming options are available, then friction brakes 190 will have to be used to decrease the generated electrical power. It should be noted that conventional drivetrain systems do not have any other components capable of using this generated electrical power as, for example, schematically shown in FIG. 1A.

Figure 1B:
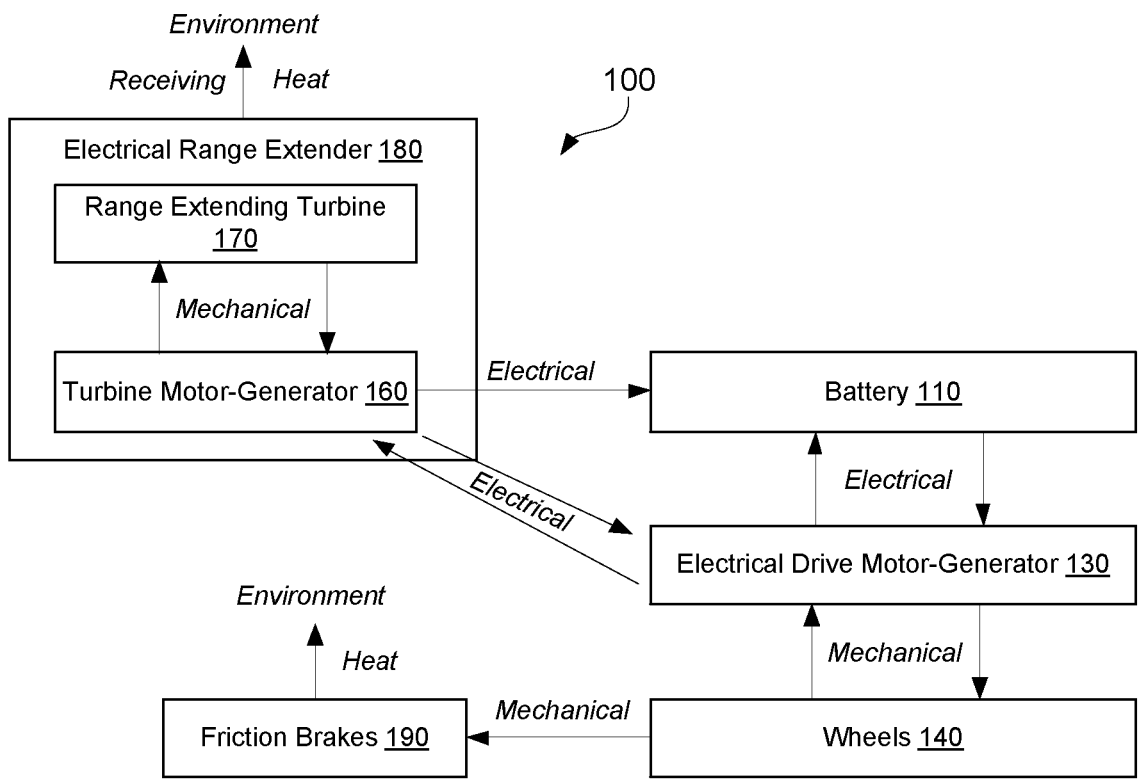

The example of drivetrain system 100 shown in FIG. 1B has a particular type of electrical range extender 180 that includes range extending turbine 170 and electrical turbine motor-generator 160 mechanically coupled to range extending turbine 170. When electrical power is needed by battery 110 or by electrical drive motor-generator 130, range extending turbine 170 is fired up and used to supply mechanical power to electrical turbine motor-generator 160, which in turn produces the electrical power. When electrical power is not needed, range extending turbine 170 is shut down. One particular aspect of range extending turbine 170 that is generally not available in conventional range extenders is turbine's ability to dissipate energy to the environment. Specifically, when electrical drive motor-generator 130 generates electrical power that cannot be used by battery 110, this electrical power is directed to electrical turbine motor-generator 160 which in turn uses this power to rotate range extending turbine 170. When rotated, range extending turbine 170 produces hot compressed that is discharged into the environment. Adding another component capable of utilizing electrical power generated by electrical drive motor-generator 130 allows to substantially reduce usage of friction brake 190. Additional aspects of drivetrain system 100 illustrated in FIG. 1B will now be described with reference to FIG. 2. It should be noted that an electrical vehicle may include various other component consuming electrical power, such as heating, ventilation, air conditioning, lights, hydraulic boosting, vacuum boosting, and the line. However, electrical power ratings of these components are substantially less than that of electrical drive motor-generator 130, battery 110, and electrical range extender 180. For clarity, these components are omitted from this description.

Drivetrain System Examples

Figure 2:
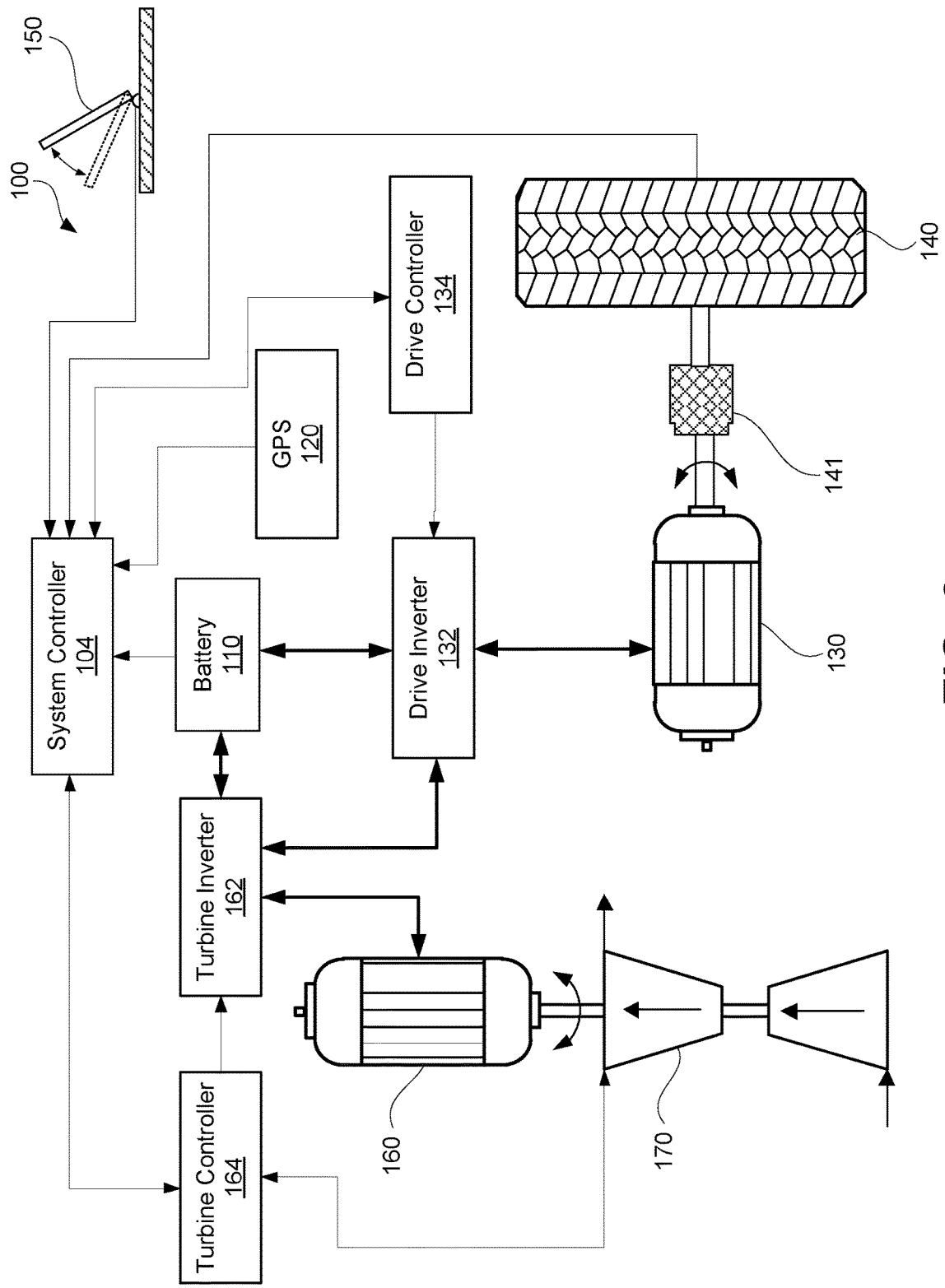
FIG. 2 is a schematic illustration of a drivetrain system of an electrical vehicle, in accordance with some embodiments.

Drivetrain system 100 illustrated in FIG. 2 may be used to apply and receive power from wheel 140. Specifically, drivetrain system 100 includes electrical drive motor-generator 130 coupled to wheel 140 either directly or through one or more other components, such as gearbox 141, differential, shaft, and the like.

Power management of electrical drive motor-generator 130 is achieved by drive inverter 132 electrically coupled to electrical drive motor-generator 130 and controlled by drive controller 134. Specifically, drive controller 134 may control electrical drive motor-generator 130 to generate electrical power at a power generation level. This power generation level may be determined by and communicated to drive controller 134 by system controller 104 as further described below. In some embodiments, drive controller 134 is integrated into system controller 104, into drive inverter 132, or it may be a standalone component of drivetrain system 100.

Drive inverter 132 may be electrically connected to battery. In some embodiments, battery 110 may have its own controllers and other circuitry (e.g., battery management system, external chargers), which are not specifically shown in FIG. 2. Various types of battery 110 may be used for drivetrain system 100, such as lithium ion batteries. Furthermore, drive inverter 132 may be electrically connected to turbine inverter 162, which controls electrical power supplied to or received by turbine motor-generator 160. Turbine motor-generator 160 is mechanically coupled to range extending turbine 170. Turbine inverter 162 may be controlled by turbine controller 164, which may be a standalone component or integrated into system controller 104 or into turbine inverter 162. Turbine controller 164 receives instructions from system controller 104 and may supply some feedback to system controller 104. Turbine controller 164 may instruct turbine inverter 162 to supply electrical power to turbine motor-generator 160 based on the power dissipating limit of range extending turbine 170. It should be noted that this limit may be set by either one of range extending turbine 170 or turbine motor-generator 160.

When electrical power is needed by battery 110 and/or by electrical drive motor-generator 130, range extending turbine 170 is fired up and it generates mechanical power that rotates turbine motor-generator 160. Turbine 170 may be operated using a variety of fuels, such as diesel, jet fuel, kerosene, and natural gas. Operation of range extending turbine 170 (e.g., firing up and shutting down) may be also controlled by turbine controller 164. In some embodiments, turbine controller 164 determines how much mechanical power is generated by range extending turbine 170. Electrical power generated by electrical turbine motor-generator 160 is distributed by turbine inverter 162 to battery 110 and/or drive inverter 132.

When electrical power is not needed by battery 110 and/or by electrical drive motor-generator 130, range extending turbine 170 is shut down. For example, range extending turbine 170 may be shut down and kept non-operational when the charge state of battery 110 is above a set charged threshold, such as at least about 60% or even at least about 80% of the total capacity. When the charge state drops below this threshold, range extending turbine 170 may be fired up and kept running until the threshold is reached. In some embodiments, other inputs, besides the charge state of battery 110, may be used to fire up or shut down range extending turbine 170. For example, a predictive algorithm analyzing vehicle route may be used to control operation of range extending turbine 170.

When range extending turbine 170 is shut down, it may be rotated by turbine motor-generator 160 resulting in compressed hot air generated and discharged into the environment. Specifically, turbine inverter 162 may supply electrical power to turbine motor-generator 160. This electrical power may be generated by electrical drive motor-generator 130 and/or, in some instances, by discharging battery 110, such as based on a predictive algorithm analyzing vehicle route. For example, battery 110 may be partially or fully discharged by rotating range extending turbine 170 before the vehicle reaches a long downgrade. Without this additional discharge using range extending turbine 170, the remaining charging capacity of battery 110 may be less than electrical energy generated by drivetrain system 100 requiring use of friction brakes. These aspects are further described below with reference to FIG. 3B.

In some embodiments, electrical power generated by electrical drive motor-generator 130 may be distributed to both battery 110 and range extending turbine 170 at the same time. This approach allows dissipating power using range extending turbine 170 even when battery 110 is being charged increasing the total energy dissipation capability of drivetrain system 100.

FIG. 2 illustrates drivetrain system 100 having system controller 104 coupled to various local controllers, such as drive controller 134 and controller turbine 164. Alternatively, one or more of these local controllers may be integrated into system controller 104. System controller 104 may receive input various sensors and/or local controllers to determine if any of the following limits have been reached: a deceleration limit, a traction limit, a power generation limit, and a power receiving limit. For example, system controller 104 may receive input from one or more wheel-speed sensors to determine if the deceleration limit and/or the traction limit is reached. The input corresponding to the power generation limit may be supplied from drive controller 134, while the power receiving limit may be supplied from turbine controller 164 and/or battery 110. System controller 104 may be operable to execute various operations of the method of operating drivetrain system 100 as described below.

In some embodiments, system controller 104 may receive instructions to decelerate the vehicle from throttle control 150, which may be communicatively coupled to system controller 104. For example, throttle control 150 may be a throttle pedal or a sensor coupled to the throttle pedal and determining position of the throttle pedal.

Another component of drivetrain system 100 may be global positioning system 120. Information from global positioning system 120, such as route information, vehicle position on this route, and the like, may be supplied to system controller 104 for executing a predictive algorithm. As described elsewhere in this document, the predictive algorithm may parse the vehicle route into segments and may determine how to distribute electrical power, which will potentially be generated in some of these segments, between the battery and/or the range extending turbine.

Examples of Operating Drivetrain Systems

Figure 3A:
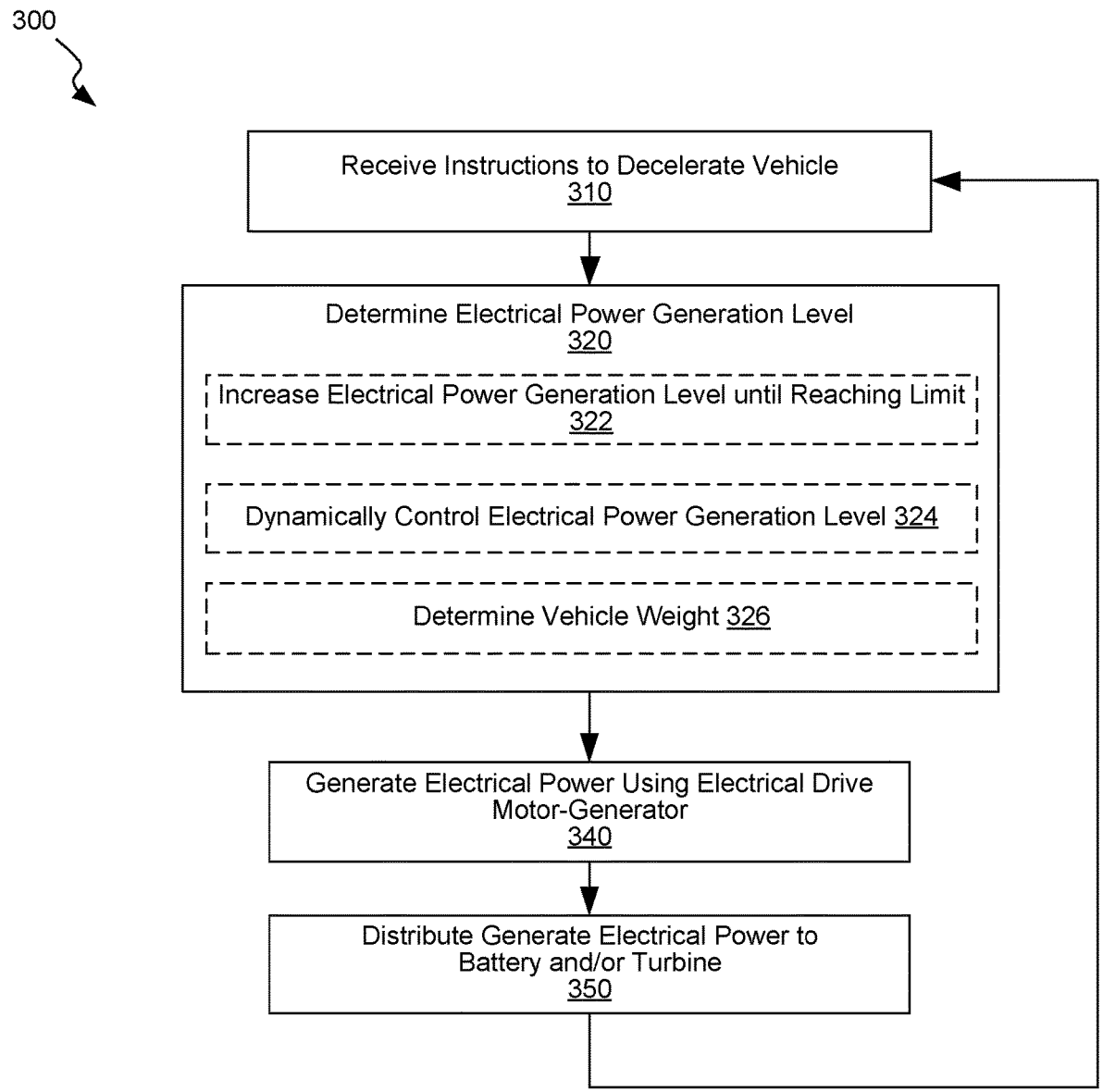
FIG. 3A is a flowchart corresponding to a method of operating a drivetrain system of an electrical vehicle, in accordance with some embodiments.

FIG. 3A is a flowchart corresponding to method 300 of operating a drivetrain system of an electrical vehicle, in accordance with some embodiments. Various examples of drivetrain system 100 and its components are described above with reference to FIGS. 1A and 2.

Method 300 may commence with receiving instructions to decelerate the electrical vehicle during operation 310. The instructions may be received from a throttle control. For example, the instructions may be received when a throttle pedal moves into the released position (e.g., a driver no longer presses on the throttle pedal). Furthermore, these instructions may be associated with a certain deceleration limit, which is later used for determining a power generation level.

Method 300 may proceed with determining the power generation level during operation 320. Specifically, the power generation level is determined based on a deceleration limit, a traction limit, a power generation limit, and a power receiving limit. Each of these limits will now be described in more details.

The deceleration limit may be a particular deceleration value corresponding to a change in a vehicle speed. In some embodiments, the deceleration limit is between about 0.1 g and 0.5 g or, more specifically, between about 0.2 g and 0.4 g such as about 0.3 g. Furthermore, a deceleration limit may be selected from different values corresponding to different inputs from the driver. The deceleration limit may be monitored using an accelerometer, wheel speed sensors, and other like sensors.

The traction limit may be a slip ratio value. In some embodiments, the slip ratio value is between about 0.1% and 10% or, more specifically, between about 0.5% and 5%. For purposes of this document, the slip ratio is defined using the following formula:

$$\text{Slip Ratio} = (\Omega \times R/V - 1) \times 100\%$$

In this formula, $\Omega$ represents an angular velocity of the wheel (which may be obtained from a wheel sensor), R represents an effective radius of the corresponding free-rolling wheel (or, more specifically, of the free rolling tire, which may be preset), and V represents a forward velocity of the vehicle (which may be a speedometer reading). It should be noted that the traction limit for each wheel (coupled to the drivetrain system) may be independently considered when determining the power generation level during operation 320.

The power receiving limit is based on the charging limit of the battery and is further based on the power dissipating limit of the range extending turbine. The charging limit of the battery may be the highest electrical power that can be used for charging the battery. The charging limit may depend on the type of the battery, current charge state of the battery, temperature of the battery, and other factors. For example, the charging limit may be preset to preserve the battery.

The power dissipating limit of the range extending turbine may depend on the power limit of the electrical drive motor-generator and/or on the operating limit of the turbine. In some cases, the power dissipating limit may be controlled to avoid excessive noise and other reasons.

The power receiving limit may be a sum of the charging limit of the battery and the power dissipating limit of the range extending turbine. This approach will require to distribute the generated electrical power to both the battery and the range extending turbine if the power generation level exceeds the charging limit of the battery and also exceeds the power dissipating limit of the range extending turbine. When the generated electrical power does not exceed the charging limit of the battery, all power may be distributed to the battery, shared between the battery and the range extending turbine, or distributed only to the turbine (when the generation power does not exceed the power dissipating limit of the turbine). In a similar manner, when the generated electrical power does not exceed the generation power does not exceed the power dissipating limit of the turbine, all power may be distributed to the turbine, shared between the battery and the range extending turbine, or distributed only to the battery (when the generation power does not exceed the charging limit of the battery).

Alternatively, the power receiving limit may be equal to the charging limit of the battery if the charging limit is above a threshold. In this example, the power dissipating limit of the turbine may be ignored if the charging limit is above the threshold. On the other hand, if the charging limit is at or below the threshold, then the power receiving limit may be equal to the power dissipating limit of the turbine. One having ordinary skill in the art would understand that other options may be used for setting the power receiving limit.

Returning to determining the power generation level during operation 320, the power generation level may be independently limited by the deceleration limit, traction limit, the power generation limit, or the power receiving limit. In other words, any one of these limits may set the power generation level. Specifically, the power generation level may set such that at least one of these limits is reached by neither one is exceeded. Typically, only one of these limit will set the power generation level when this particular limit is reached. In rear instances, multiple limits may be reached when setting the power generation level.

Initially, operation 320 may comprise increasing the power generation level until reaching at least one of the limits as schematically shown by optional block 322 in FIG. 2. For example, no power may be generated initially when the instructions to decelerate the vehicle are received. Upon receiving of the instructions, the level of the generated power may be increased (gradually or in a stepped fashion) until reaching one of the limits. The factors corresponding to each of these limits may be repeatedly controlled.

Furthermore, as the vehicle continues to operate, the limit, which may have initial set the power generation level, may change. More specifically, the value of the limit may change (e.g., charging of the battery may reduce the power receiving limit, change in road condition) or one limit may be replaced with another limit. For example, the vehicle may initially drive on a slippery road, and the traction limit may set the power generation level. Later, the road condition may improve while the battery may approach its fully charge state, and the power receiving limit may set the power generation level. As such, operation 320 may comprise dynamically controlling the power generation level during operation 324. This control is performed such that at least one of these limit is always reached but neither one is exceeded. A brief description of each limit will now be presented.

The power generation level limited by the deceleration limit may depend on road incline. For example, the power generation level will be higher for a vehicle travelling downhill than for the same vehicle travelling on a flat road to achieve the same deceleration. Furthermore, the power generation level limited by the deceleration limit may depend on the vehicle weight. For example, the power generation level will be higher for a heavy vehicle than for a light vehicle travelling to achieve the same deceleration (at least when travelling downhill or on a flat road).

The power generation level limited by the traction limit depends on road surface condition. For example, the power generation level will be lower for a slipper road than for a road with good traction assuming that this level is limited by the traction limit.

Method 300 may proceed with generating electrical power at the power generation level during operation 340. The power is generated using an electrical drive motor-generator coupled to wheels of the electrical vehicle. During this operation, the electrical drive motor-generator is operated in a generation mode. It should be noted that if the power generation level is zero or below some threshold, then operation 340 may not be performed. In this case, the vehicle may rely exclusively on friction brakes to reach its deceleration limit. Furthermore, in some instances, operation 340 is performed together with using friction brakes. For purposes of this disclosure, the drivetrain system and brakes are independently operated systems.

When operation 340 is performed, method 300 proceeds with distributing the generated electrical power during operation 350. The generated electrical power is distributed to at least one of the battery or the range extending turbine. It may be distributed to only one of the battery and the range extending turbine. In some cases, it is distributed to both the battery and the range extending turbine. The distribution is performed based on the charging limit of the battery and the power dissipating limit of the range extending turbine. For example, the generated electrical power may be distributed entirely to the battery if the charging limit of the battery is equal or greater than the power generation level. This may be referred to as a battery first approach and may be a default position unless other input is provided. The battery stores electrical power for future uses and as a result may have a higher power receiving priority than the range extending turbine. In some embodiments, the generated electrical power is distributed to the range extending turbine if the charging limit of the battery is less than the power generation level. In other words, the battery cannot use all of the generated power and some or all of it has to distributed to the range extending turbine.

In some embodiments, directing at least some of the generated electrical power to range extending turbine comprises rotating the range extending turbine using the turbine motor-generator. Specifically, the electrical power directed to turbine is used by the turbine motor-generator to convert this electrical power into mechanical power, which is then transferred to the turbine and eventually discharged into the environment as hot compressed air.

Figure 3B:
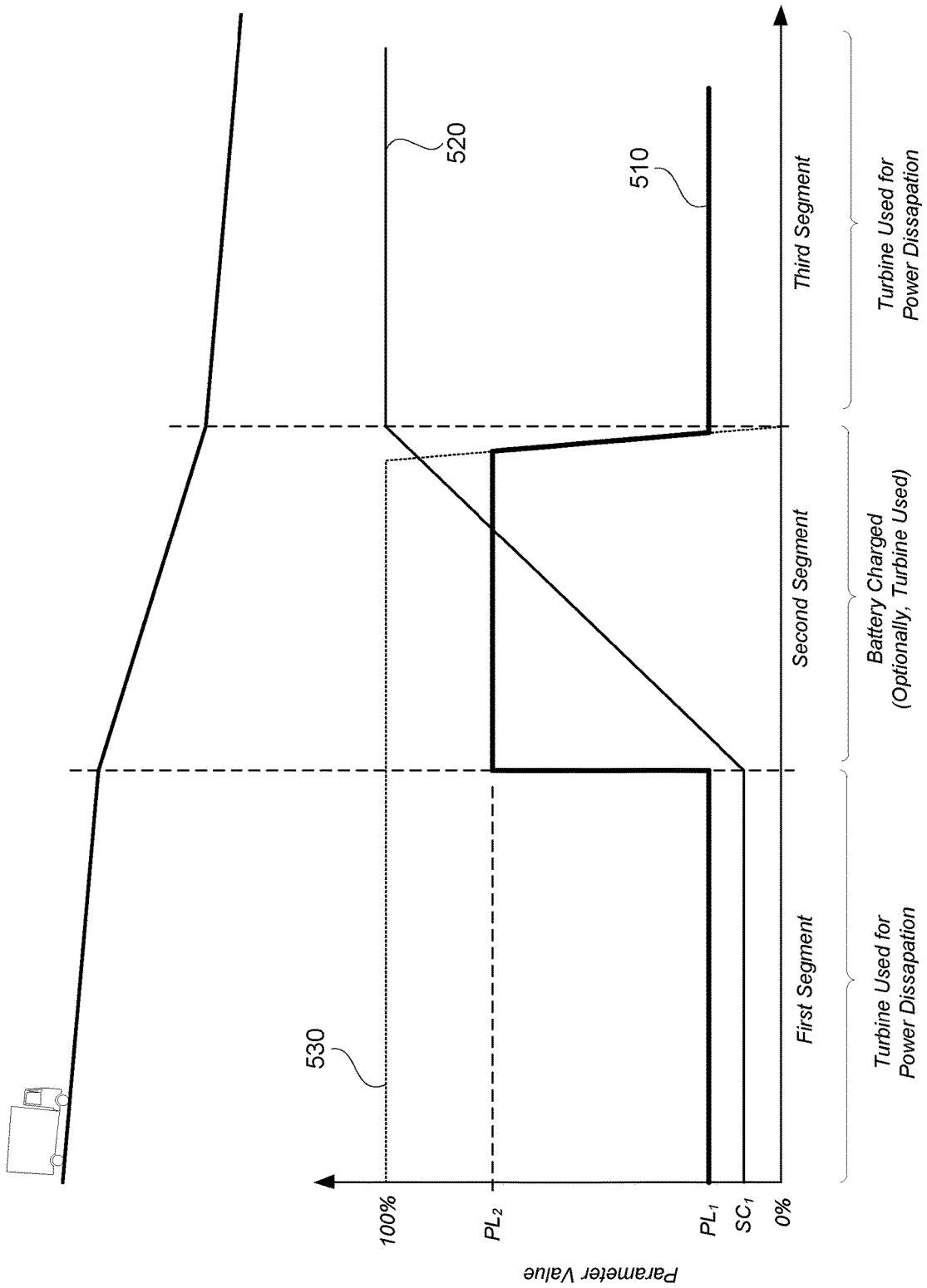
FIG. 3B is a schematic illustration of a vehicle route and corresponding plots of a generated power level, a battery state of charge, and a battery charging limit along this route, in accordance with some embodiments.

In some embodiments, the power generation level is further determined based on the vehicle route and vehicle weight and selected to minimize friction brake usage. For example, the vehicle route may include a long decline with a mix of steep and shallow segments as schematically shown in FIG. 3B. The power generation level in each of these segments may be selected to ensure that the battery is fully charged at the end of the overall decline when power from the battery is eventually needed. Furthermore, the power generation level in each of these segments may be selected to maximally use the turbine to reduce the friction brake usage. Depending on an expected power generation level in each segments and distribution of these expected power generations levels along the route, the drivetrain system (or, more specifically, the system controller) needs to decide using a predictive algorithm how to distribute the generated electrical power to achieve both goals listed above (i.e., the primary goal being a fully charged battery at the end and a secondary goal being maximum turbine utilization for power dissipation). The battery first approach described above may not always work in this predictive algorithm. Furthermore, it should be noted that power generation levels are only expected and may actually be different when this particular segment is reached (e.g., due to the road conditions).

Referring to a route example shown in FIG. 3B, the first segment may be shallow corresponding to electrical power 510 generated at a first level ($PL_1$). This level is determined based on the limits described above. Furthermore, this level may also depend on the grade of this segment and the vehicle weight. When the vehicle reaches this segment, the battery may have a low level of state of charge 520 ($SC_1$), which corresponds to a high level of battery charging limit 530 (shown at 100%). In this example and this first segment, battery charging limit 530 is greater than generated power 510 and all generated power could be used to charge the battery. However, if the battery is charged during this segment, it may not be available for charging later, e.g., during the second segment when generated power 510 is a higher level and cannot be all distributed to the range extending turbine. As such, the system controller needs to know information about all segments of the vehicle route to adequately execute the predictive algorithm.

Referring again to the first segment, the first level ($PL_1$) of generated electrical power 510 may less than the power dissipating limit of the range extending turbine. As such, all generated electrical power 510 may be directed to the range extending turbine while battery state of charge 520 remains the same, also resulting in battery charging limit 530 staying at the same level.

Once the second steeper segment of the route is reached, generated electrical power 510 increase to a second level ($PL_2$), which may be higher than the power dissipating limit of the range extending turbine and the battery receives some generated electrical power 510 to avoid or minimize the use of friction brakes. During this second segment, battery state of charge 520 increases to 100%, which indicates the batter is fully charged at the end of the second segment. Battery charging limit 530 drops as the battery reaches its fully charged state. It should be noted that if the battery was charged during the first segment, the battery would become fully charged before the end of the second segment and the friction brakes would have to be used. As such, delaying the battery charging until the second segment effectively reduces the use of friction brakes.

During the third shallow segment, generated electrical power 510 drops back to the first level ($PL_1$) and all generated electrical power 510 can be distributed to the range extending turbine. The battery remains fully charged during this period and toward the end of all three segments. This simplified example illustrates how two goals of the predictive algorithm can be achieved when the vehicle route and vehicle gross weight information is available.

In some embodiments, the vehicle route and vehicle's current position on this route is provided to the system controller using a global positioning system (GPS). The vehicle glass weight may be determined during optional operation 326 by monitoring two or more vehicle deceleration conditions and corresponding power values generated by the electrical drive motor-generator.

Application Example

Figure 4:
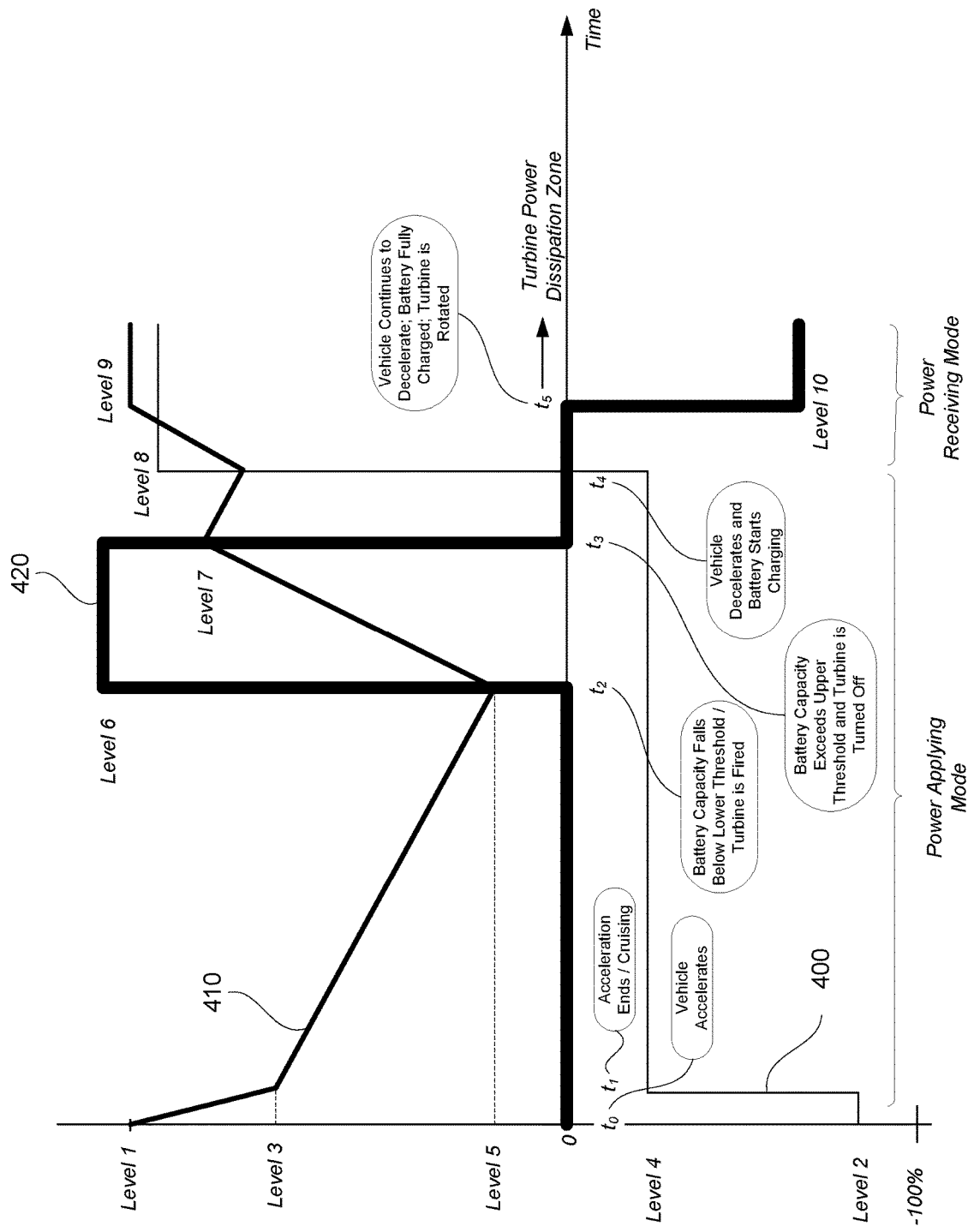
FIG. 4 is a schematic illustration of a vehicle power demand profile, a turbine power output profile, and a battery state of change profile over time, in accordance with some embodiments.

FIG. 4 is a schematic illustrations of vehicle power demand plot 400 (thin line), turbine power output plot 420 (thickest line), and battery charge state plot 410 (mid-thick line) overtime, in accordance with some embodiments. Initially (at to), the battery may be fully charged, which is reflected by battery charge state plot 410 starting at Level 1. The vehicle may accelerate during the period from $t_0$ to $t_1$, which corresponds to vehicle power demand 400 being at Level 2. It should be noted that because the vehicle consumes power during this period, Level 2 has a negative value. As a result of this power demand, the battery is being discharged at the corresponding rate and its charge state 410 may drop from Level 1 to Level 3 during the same period. It should be noted that the turbine is not used during this period and turbine power output plot 420 stays at a zero level.

At $t_1$, the vehicle stops accelerating and, for example, starts maintaining its speed. Vehicle power demand 400 goes to Level 4, which is less (in absolute values) than Level 2. Because of the reduced vehicle power demand 400, the battery is discharged at a lower rate, which is reflected by charge state line 410 being less steep (changing slope at $t_1$).

The turbine is still not used during this period and turbine power output plot 420 continues to stay at a zero level.

At $t_2$, battery charge state 410 reaches a certain minimum threshold shown as Level 5. At this point, the battery needs to be recharged. This accomplished by turning on the turbine, also at $t_2$. As a result, turbine power output plot 420 goes from zero to Level 6. The turbine power output is used to recharge the battery, which starting form $t_2$ is shown by positively slopped battery charge state plot 410. Furthermore, in this example, the turbine power output is used to supply vehicle power demand 400, which in this example continues to stay at Level 4.

Once battery charge state 410 reaches a certain maximum threshold at $t_3$, shown as Level 7, the turbine is shut down since no further battery charging is needed. As a result, turbine power output 420 goes back to zero at $t_3$.

The vehicle continues to maintain its speed until $t_4$ and the period from $t_3$ to $t_4$ may be similar to the period from $t_1$ to $t_2$ since vehicle power demand 400 stays at Level 4 and is provided only by discharging the battery in both periods. Furthermore, the period $t_0$ to $t_4$ may be referred to the power applying mode since the power is applied to the wheels by the drive train system during the entire period, i.e., at Level 2 from $t_0$ to $t_1$ and at Level 4 from $t_1$ to $t_4$.

At $t_4$, the vehicle may switch from the power applying mode to the power receiving mode as shown by vehicle power demand 400 dropping from Level 4 to Level 8. It should be noted that Level 8 now has a positive value and the power is now received by the drivetrain system. This received power is used to charge the battery, which is shown by positively slopped battery charge state plot 410. The charging may continue until battery charge state 410 reaches another maximum threshold at $t_5$, shown as Level 9. It should be noted that when the battery is charged by running the turbine, the maximum threshold may be different from the one when the battery is charged by receiving the power from the wheels. In some embodiments, the second threshold may be greater and may even correspond to a 100% state of charge. The first threshold may be lower, for example, to accommodate some unexpected regenerative power. For example, the first threshold may be between about 10% and 25% less than the first threshold. The difference depends on the time and other factors associated with starting and shutting down the turbine.

Battery charge state 410 reaches the maximum threshold at $t_5$ and the battery cannot be further charged. Vehicle power demand 400 is still at Level 8 and the electrical power is still generated but now is used to rotate the turbine. This turbine rotation reflected by turbine power output 420 going from zero to Level 10 at $t_5$. It should be noted that the value of Level 10 is negative, because the power is now used by the turbine rather generated.

Overall, FIG. 4 is a simplified example of utilizing a range extending turbine to dissipate at least some electrical power generated by an electrical drive motor-generator that cannot be distributed to the battery. One having ordinary skill in the art would understand that various other examples also within the scope.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of operating a drivetrain system of an electrical vehicle, the method comprising:
   receiving instructions to decelerate the electrical vehicle;
   determining a power generation level based on
      a deceleration limit,
      a traction limit,
      a power generation limit, and
      a power receiving limit,
         wherein the power receiving limit is based on a charging limit of a battery and further based on a power dissipating limit of a range extending turbine;
   generating an electrical power at the power generation level using an electrical drive motor-generator coupled to wheels of the electrical vehicle; and
   distributing the electrical power generated by the electrical drive motor-generator to at least one of the battery or an electrical turbine motor-generator mechanically coupled to the range extending turbine and configured to drive the range extending turbine using the electrical power, wherein the electrical power is distributed based on the range extending turbine based on the charging limit of the battery and the power dissipating limit of the range extending turbine.

2. The method of claim 1, wherein the power generation level is independently limited by the deceleration limit, the traction limit, the power generation limit, or the power receiving limit.

3. The method of claim 1, wherein determining the power generation level comprises increasing the power generation level until reaching at least one of the deceleration limit, the traction limit, the power generation limit, or the power receiving limit.

4. The method of claim 1, wherein determining the power generation level further comprises dynamically controlling the power generation level such that at least one of the deceleration limit, the traction limit, the power generation limit, or the power receiving limit is reached and such that neither one of the power generation level until reaching at least one of the deceleration limit, the traction limit, the power generation limit, or the power receiving limit is exceeded.

5. The method of claim 1, wherein the power generation level limited by the deceleration limit depends on road incline.

6. The method of claim 1, wherein the power generation level limited by the traction limit depends on road surface condition.

7. The method of claim 1, wherein the power receiving limit is a sum of the charging limit of the battery and the power dissipating limit of the range extending turbine.

8. The method of claim 1, wherein the power receiving limit is equal to the charging limit of the battery if the charging limit is above a threshold.

9. The method of claim 1, wherein the electrical power generated by the electrical drive motor-generator is distributed entirely to the battery if the charging limit of the battery is equal or greater than the power generation level.

10. The method of claim 1, wherein the electrical power generated by the electrical drive motor-generator is distributed to the range extending turbine if the charging limit of the battery is less than the power generation level.

11. The method of claim 10, wherein the electrical power generated by the electrical drive motor-generator is further distributed to the battery.

12. The method of claim 1, wherein the electrical power generated by the electrical drive motor-generator is distributed entirely to the range extending turbine.

13. The method of claim 1, wherein distributing the power generated by the electrical drive motor-generator to at least one of the battery or the range extending turbine is further based on a vehicle route and a vehicle gross weight and selected to minimize friction brake usage.

14. The method of claim 13, wherein the vehicle route comprises grade value for each segment of the vehicle route.

15. The method of claim 13, further comprising determining the vehicle gross weight.

16. The method of claim 1, wherein the instructions to decelerate the electrical vehicles are received from a throttle control of the electrical vehicle.

17. The method of claim 16, wherein the instructions to decelerate the electrical vehicles are received when a throttle pedal of the throttle control is in a released position.

18. A drivetrain system of an electrical vehicle, the drivetrain system comprising:
  a battery;
  a range extending turbine;
  an electrical turbine motor-generator mechanically coupled to the range extending turbine and configured to convert mechanical power received from the range extending turbine into electrical power during power generation and to drive the range extending turbine during power dissipation;
  an electrical drive motor-generator mechanically coupled to wheels of the electrical vehicle and electrically coupled to the battery and to the electrical turbine motor-generator; and
  a system controller configured to determine a power generation level based on a deceleration limit, a traction limit, a power generation limit, a power receiving limit,
    wherein the power receiving limit is based on a charging limit of the battery and further based on a power dissipating limit of the range extending turbine.

19. The drivetrain system of claim 18, wherein the system controller is coupled to a throttle control of the electrical vehicle.

20. The drivetrain system of claim 18, wherein the system controller is coupled to a global positioning system of the electrical vehicle providing vehicle route information and vehicle position information to the system controller for determining the power generation level.

* * * * *